United States Patent [19]

Howell

[11] Patent Number: 5,641,200
[45] Date of Patent: Jun. 24, 1997

[54] CHILD RESTRAINT SEAT FOR SHOPPING CART

[76] Inventor: Jo Ann Howell, Rte. 1 Box 164-AA, Carthage, Tex. 75633

[21] Appl. No.: 592,665
[22] Filed: Jan. 26, 1996
[51] Int. Cl.$^6$ .................................................. A47C 1/08
[52] U.S. Cl. ................ 297/256.17; 297/484; 280/33.993
[58] Field of Search ......................... 297/485, 256.17, 297/255, 254, 468, 483, 484, 486, 229; 280/33.99, 33.993

[56] References Cited

U.S. PATENT DOCUMENTS

| | | | |
|---|---|---|---|
| 3,604,750 | 9/1971 | Doering | 297/484 X |
| 4,108,489 | 8/1978 | Salzman | 297/37 |
| 4,204,695 | 5/1980 | Salzman | 280/33.99 |
| 4,234,229 | 11/1980 | Arnold | 297/467 |
| 4,324,430 | 4/1982 | Dimas, Jr. | 297/250 |
| 4,550,800 | 11/1985 | Dietrich | 182/3 |
| 4,655,502 | 4/1987 | Houllis | 297/229 |
| 4,867,464 | 9/1989 | Cook | 280/33.993 |
| 5,123,673 | 6/1992 | Tame | 280/801 |
| 5,203,613 | 4/1993 | Ward | 297/484 X |
| 5,207,481 | 5/1993 | Ayala, Jr. | 297/464 |
| 5,238,293 | 8/1993 | Gibson | 297/229 |
| 5,263,726 | 11/1993 | Wood | 280/33.932 |

Primary Examiner—Laurie K. Cranmer
Attorney, Agent, or Firm—John M. Harrison

[57] ABSTRACT

A child restraint seat for securing a child in a shopping cart, which child restraint seat includes a seat segment and backrest or a combination seat segment and backrest, for receiving and supporting the child and designed to rest on the support grid and rear grid of the seating area in the shopping cart. A pair of shoulder straps are attached to the seat for extending around a rear grid member and a front grid member of the shopping cart and then around tile child, and a lap strap is also attached to the seat and extends around opposite side grid members of the shopping cart and across the lap of the child, if required, to restrain the child in seating position in the shopping cart. In a preferred embodiment the shoulder straps are crossed behind and in front of the child and include strap loops for receiving the lap strap and both the shoulder straps and the lap straps are removably attached by quick-disconnect couplings.

13 Claims, 2 Drawing Sheets

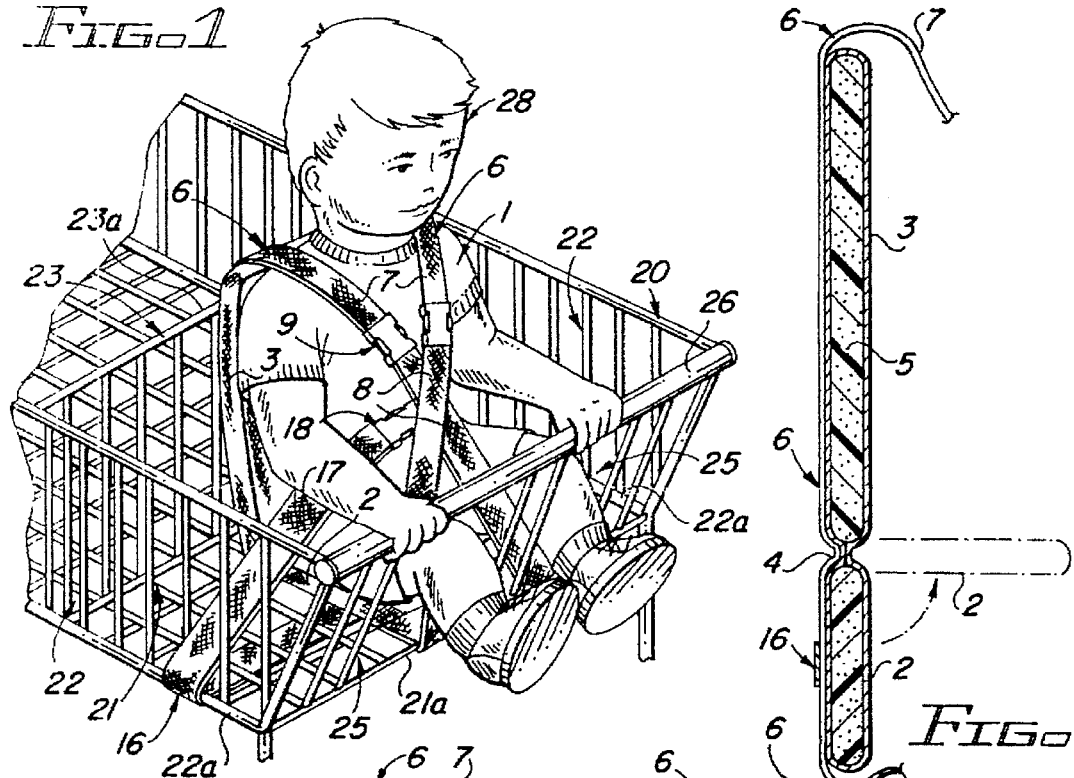
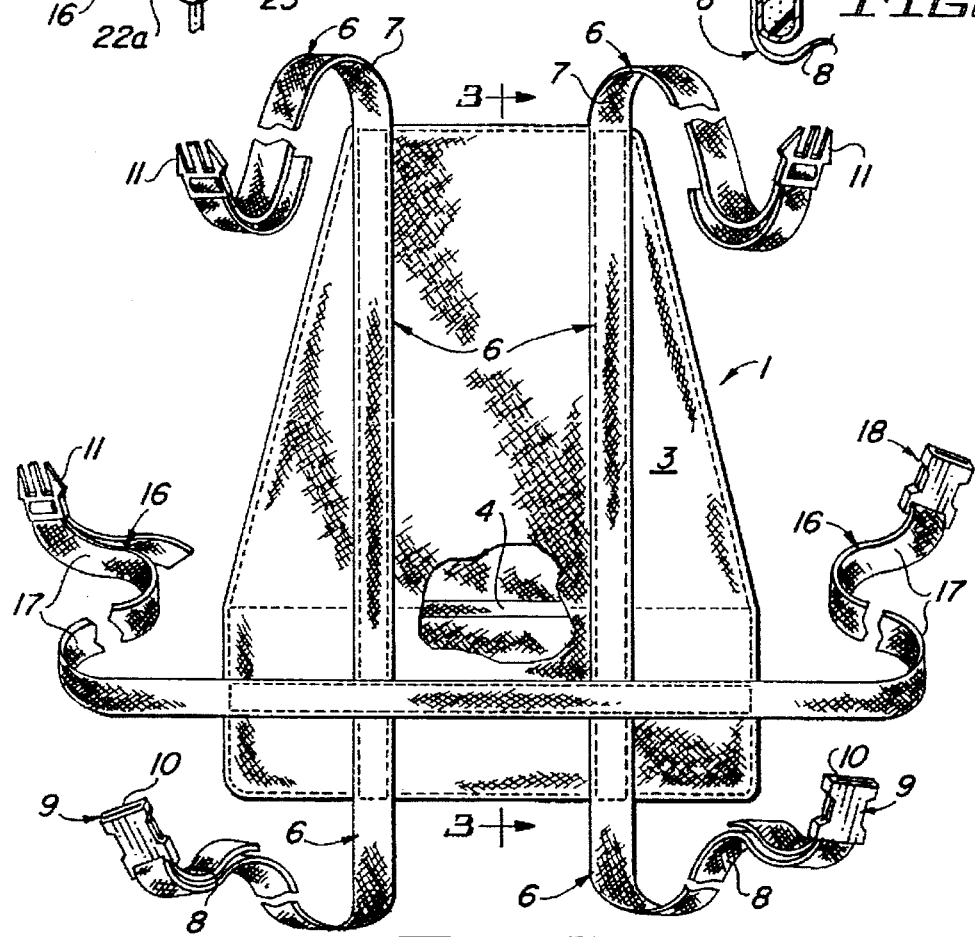

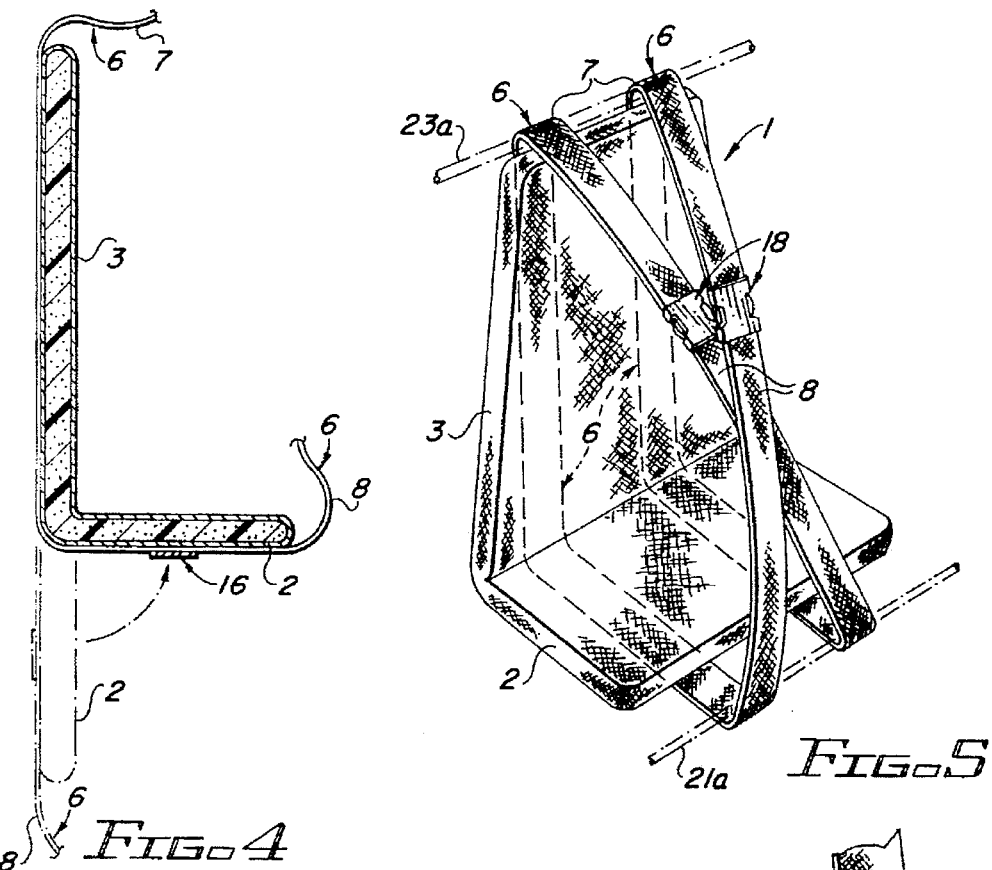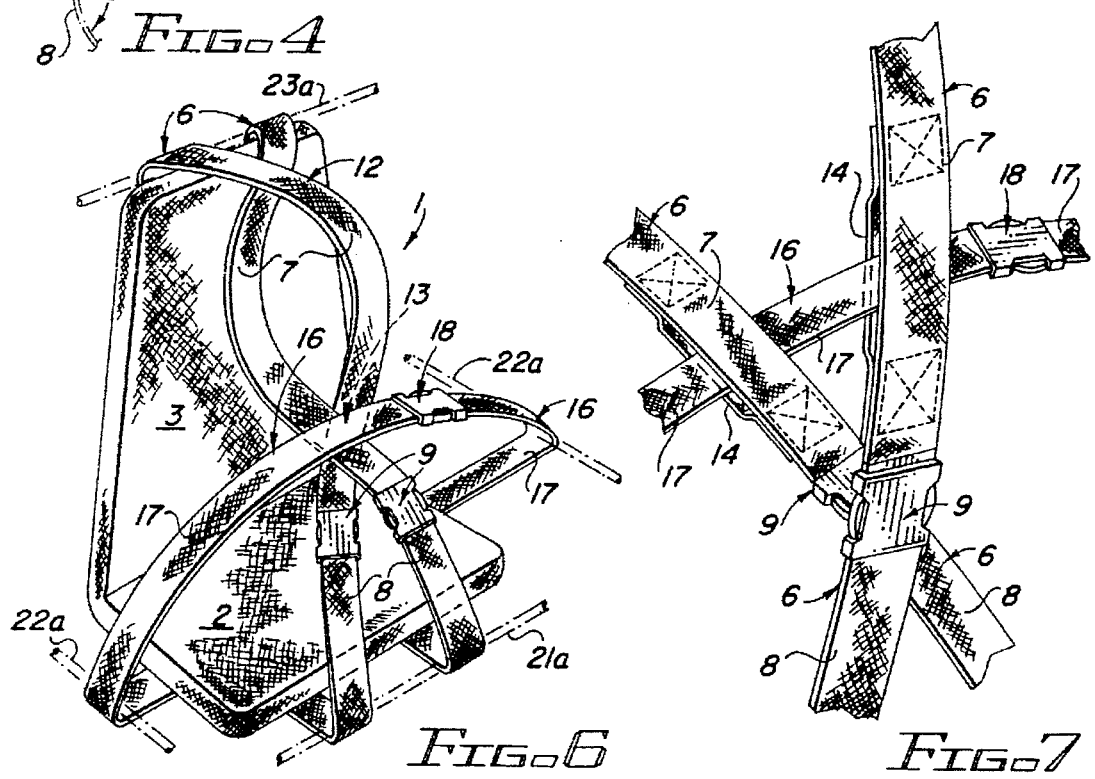

CHILD RESTRAINT SEAT FOR SHOPPING CART

BACKGROUND OF THE INVENTION

1. Field of the Invention

This invention relates to child restraining devices and more particularly, to a child restraint seat for mounting in a shopping cart and restraining the child from excessively moving, standing or climbing in the shopping cart. In a preferred embodiment the child restraint seat is characterized by a seat portion and a backrest portion hingedly connected to the seat portion, or a one-piece, combination seat and backrest, for fitting in the seating area of the shopping cart defined by front, rear and side grids, with the child's legs extending through the leg openings provided in the front grid of the shopping cart. The child restraint seat further includes a pair of shoulder straps secured to the seat and designed for extending around one or more grid members in the rear grid and the front grid, across the shoulders and between the legs of the child and double-crossed at the neck and chest of the child. A lap strap is preferably also attached to the seat and extended around oppositely-disposed side grid members in the side grids of the shopping cart across the lap of the child, with both the shoulder straps and lap strap connected, respectively, by quick-disconnect couplings and serving to secure the child in the child restraint seat with the child's legs extending through the leg openings in the front grid of the shopping cart. The child restraint seat thus allows limited movement of the child within the shoulder and lap strap system, but the straps prevent the child from excessively moving, standing, leaning or otherwise placing themselves in a dangerous or precarious position where he or she might fall from the shopping cart. In a most preferred embodiment of the invention both the shoulder straps and the lap strap are fitted with quick-disconnect couplings or connectors to facilitate ease in strapping the child in the child restraint seat and removing the child from the child restraint seat, as deemed necessary.

One of the problems inherent in the use of child restraint seats of various design and more particularly, in restraining children from standing or dangerously leaning over the side of shopping carts, is that of adequately restraining the child in the seating position for which the shopping cart was designed. Conventional shopping carts are usually designed with a seating area for children, which seating area is defined by parallel side grids and parallel front and rear grids, with leg openings provided in the front grid for receiving the child in seating position facing the operator of the shopping cart. However, there is usually no restraint system provided in shopping carts to maintain the child in this seated position and while the operator is shopping, or while his or her attention is diverted to other things, the child may easily stand or lean over the side of the shopping cart and fall from the seating area to the floor. This is particularly true of hyperactive children that must be watched at all times. Some shopping carts are fitted with a single seat belt attachment which is similar to the seat belt in an automobile and has a conventional buckle for strapping the belt over the lap of the child. However, many children, and particularly those who are hyperactive, are able to quickly and easily extricate themselves from the seat belt and risk falling over the side of the shopping cart as if the seat belt were not in place.

2. Description of the Prior Art

In addition to the single seat belt-type strap sometimes provided in shopping carts as described above, various other restraint devices for children are known in the art. Typical of these is the collapsible child seats detailed in U.S. Pat. No. 4,108,489, dated Aug. 22, 1978, to Marilyn F. Salzman. The collapsible child seats detailed in this patent are specially designed for use in conventional shopping carts and have side restraining flaps for preventing a child from falling laterally to either side. The fully collapsed seat may be carried in a woman's purse to the supermarket, where it is easily unfolded and secured in the seating area of the shopping cart. Alternatively, the seat may be permanently attached to the shopping cart for use in transporting an infant. U.S. Pat. No. 4,204,695, dated May 27, 1980, also to Marilyn F. Salzman, details another shopping cart child's seat. A single strap is provided in the collapsible child seat detailed in U.S. Pat. No. 4,108,489 for securing the child in the seat and the seat to the shopping cart. U.S. Pat. No. 4,234,229, dated Nov. 18, 1980, to Jonathan H. Arnold, details a "Safety Harness For Infants". The safety harness is used in combination with a lap belt for holding an infant in face-to-face relationship against the chest of an adult passenger in an airplane. The harness includes an apron or bib-like fabric defining a pouch adapted to receive the back and rump of the infant. It carries a belt loop for detachably securing the harness to the lap belt, together with inner and outer strap subassemblies. The inner one of the two strap subassemblies releasably fastens the infant to the pouch, while the outer one similarly releasably fastens the adult to both. U.S. Pat. No. 5,238,293, dated Aug. 24, 1993, to Donna S. Gibson, details a "Shopping Cart Seat Cover". The seat cover includes a sheet of double quilted material having a first rectangular panel located at the rear end of the sheet, the bottom surface of the sheet provided with a fastener strip to secure the quilted material to the shopping cart. The forward end of the sheet has a second rectangular panel and a central panel extending between the first and second rectangular panels, which central and second panels are folded to define a pocket that is received over a portion of the cart to hold an infant. U.S. Pat. No. 4,324,430, dated Apr. 13, 1982, to Herman Dimas, Jr. et al, details an "Infant Carrier Particularly for Grocery Store Shopping Carts". The carrier includes a molded backrest and seat portion for receiving an infant, and straps attached to the carrier to anchor it to both the back and seat portions of the shopping cart seat structure, while other attached straps on the carrier hold the infant against toppling forwardly or laterally. A further detachable and adjustable strap allows mounting of the infant carrier on the body of an adult for transportation. A "Shopping Cart Safety Belt" is detailed in U.S. Pat. No. 4,550,800, dated Nov. 5, 1985, to Gloria L. Dietrich. The device includes a belt with an adjustable loop on one end and a snap hook on the other end. The loop is placed around the child's waist, the snap hook end is brought through the middle bars of the shopping cart backrest and the snap hook is then attached to a metal bar on either side of the cart. When the belt is in place, the child is secured in the shopping cart. U.S. Pat. No. 4,655,502, dated Apr. 7, 1987, to Cynthia A. Houllis, details a "Multi-Adjustable Cushion For Shopping Cart". The cushion includes a back portion which is adjustable for the width of the seat basket in a shopping cart, while the front portion of the seat cushion may be rolled about the handle of the shopping cart and secured with an adjustable fastener. A pair of apertures are provided in the device for receiving the legs of the child and a seat belt is provided for retaining the infant in the seat. Accessory tethering straps may be provided for the application of toys or like objects for entertainment of the child. U.S. Pat. No. 4,867,464, dated Sep. 19, 1989, to Kenna M. Cook, details a "Child Restraining Safety Belt or Harness". The device includes a middle strap member that overlaps a child's stomach and wraps around part of the backrest of a shopping cart seat. A pair of shoulder straps are secured at a first end to the middle strap member and overlie the child's shoulders. A second end of each shoulder strap member is fixedly secured to a flat member that is looped to carry a pair of large "D" ring members, to which is releasably secured a bottom member that extends from the middle strap member under the shopping cart seat to the "D" ring member to unite the shoulder strap members to the bottom strap member. U.S. Pat. No. 5,123,673, dated Jun. 23, 1992, to Omar D. Tame, details a "Seat Belt System For A Vehicle Seat". The apparatus includes a three-point belt system forming a lap belt and a shoulder belt and further includes a second shoulder belt, to form a four-point system. The belt system includes a presentor mechanism to move the clasp for the three-point portion of the system into an easy-to-reach position and encourage seat belt usage. Two buckles are provided on opposite sides of the seat with a release mechanism provided to automatically release one buckle upon manual release of the other buckle, regardless of which buckle is first manually released. U.S. Pat. No. 5,207,481, dated May 4, 1993, to Raymond J. Ayalla, Jr. et al, details a "Bumper Apparatus For High Chairs". The apparatus includes a bumper for extending across the front of the seat of a high chair and attachment of the bumper to the vertical post of the chair. U.S. Pat. No. 5,263,726, dated Nov. 23, 1993, to Jerry W. Wood, includes a child restraint strap for shopping cart seats. The shopping cart includes an infant seat and a safety belt restraint device for restraining the infant to prevent the infant from falling from the seat. The safety belt restraint device extends around the waist and between the legs of the infant to secure the infant in the seat.

It is an object of this invention to provide a new and improved child restraint seat for mounting in a shopping cart, which child restraint seat is characterized by separate or one-piece support and backrest portions for receiving the child and positioning the child in the seating area of a shopping cart with the child's legs extending through openings provided in the front grid of the shopping cart. A first pair of shoulder strap segments are secured to the seat and extend around a rear grid element of the rear grid of the shopping cart and across the shoulders of the child in single or double-lapped configuration, with one of the laps optionally completed behind the neck of a child and the other in front of the child's neck. A second pair of shoulder strap segments also extend from fixed attachment to the seat, around a front grid element of the front grid of a shopping cart and between the child's legs, to connect to the first pair of shoulder strap segments, respectively, by means of quick disconnect couplers or connectors. A pair of lap strap segments may also be attached to the seat and extend around opposite side grid elements in the side grids of the shopping cart and across the lap of the child to buckle together by means of a quick disconnect coupler or connector. Accordingly, the shoulder straps and lap strap serve to restrain the child in the seating area of the shopping cart and yet allow limited movement of the child while so restrained.

Another object of this invention is to provide a new and improved child restraint seat for a shopping cart, which restraint includes a seat having support and backrest portions provided in hinged relationship with respect to each other or in one piece and padded for receiving the child in the seating area of a shopping cart, with the child's legs extending through leg openings provided in the front grid of the shopping cart. Shoulder straps and an optional lap strap are connected in segments to the seating and backrest segments or areas of the seat and extend around the shoulders, between the legs and across the lap of the child, as well as around the shopping cart grid members, to secure the child in the seat and the seat in the shopping cart.

Still another object of this invention is to provide a child restraint seat for shopping carts, which child restraint seat includes a one-piece, flexible and resilient seat mat or pad for positioning in the seating area of the shopping cart and receiving a child, the legs of which child extend through leg openings located in the front grid of the shopping cart. A pair of top shoulder strap segments have one end fixedly attached to the seat, extend from the seat around a shopping cart back support bar and are crossed behind the head of the child and extend around the neck of the child, where the top shoulder strap elements are crossed again at the chest of the child. A pair of bottom shoulder strap segments are also fixedly attached to the child restraint seat and extend around a support grid element of the shopping cart between the legs of the child and attach, respectively, by means of quick-disconnect buckles to the top crossed segments of the shoulder strap. A pair of lap strap segments have one end fixedly attached to the child restraint seat and each extend around opposite side grid elements in the shopping cart, across the lap of the child where they are connected by a quick disconnect buckle, the shoulder strap segments and lap strap segments serving to secure the child safely in the shopping cart at all times.

SUMMARY OF THE INVENTION

These and other objects of the invention are provided in a new and improved child restraint seat for shopping carts, which child restraint seat is characterized in a preferred embodiment by a padded seat segment and a padded backrest segment connected by a cloth, fabric or plastic hinge or molded or provided in one piece from a flexible, resilient material, to facilitate receiving a child in seated configuration in the seating area of a shopping cart, with the child's legs extending through openings provided in the front grid of the shopping cart. A pair of nylon webbing upper shoulder straps each has one end fixed to the backrest segment of the seat and the shoulder straps extend around a rear, back-supporting grid member of the shopping cart, where the upper shoulder strap segments are optionally crossed behind the neck of the infant and further extend over the shoulders of the infant and are crossed at the chest of the infant. A pair of nylon webbing lower shoulder straps have one end fixed to the seat portion of the seat and extend around a support grid element of the shopping cart between the legs of the infant and attach by means of quick-disconnect couplings to the upper shoulder strap segments. A pair of nylon webbing lap strap segments are preferably also fixed to the seat segment of the child seat and extend around opposite side grid elements of the shopping cart and across the lap of the infant, where they may extend through optional strap loops in the lower shoulder straps and buckle together by means of quick disconnect couplings.

BRIEF DESCRIPTION OF THE DRAWING

The invention will be better understood by reference to the accompanying drawings, wherein:

FIG. 1 is a perspective view of a first preferred embodiment of the child restraint seat of this invention;

FIG. 2 is a rear view of the child restraint seat illustrated in FIG. 1;

FIG. 3 is a sectional view taken along line 3—3 of a two-piece, hinged embodiment of the child restraint seat illustrated in FIG. 2;

FIG. 4 is a sectional view of a one-piece embodiment of the child restraint seat illustrated in FIG. 2;

FIG. 5 is a perspective view of an alternative preferred embodiment of the child restraint seat of this invention;

FIG. 6 is a perspective view of an alternative shoulder strap configuration of the child restraint seat embodiment illustrated in FIG. 1; and FIG. 7 is an alternative shoulder strap embodiment of the child restraint seat, wherein the shoulder straps are fitted with strap loops for receiving a lap strap.

DESCRIPTION OF THE PREFERRED EMBODIMENTS

Referring initially to FIGS. 1–4 and 6 of the drawings, a first preferred embodiment of the child restraint seat of this invention is generally illustrated by reference numeral 1 and includes a seat segment 2, connected to or formed or built integrally with a backrest 3, both elements of which may be padded to receive a child 28. The seat segment 2 may be connected to the backrest 3 at a fabric, cloth or plastic hinge area 4, as illustrated in FIG. 3, or the seat segment 2 and the backrest 3 may be integrally formed of a resilient material such as a suitable flexible, resilient, expanded foam composition as illustrated in FIG. 4, according to the knowledge of those skilled in the art. Padding 5 may be provided in the seat segment 2 and the backrest 3 of a fabric or cloth seat, as desired. Shoulder straps 6 are stitched or otherwise attached to the backrest 3 and the seat segment 2 and connect at a corresponding shoulder strap buckle 9, in order to help secure the child 28 in position on the seat segment 2 and the backrest 3 of a shopping cart 20. Specifically, a pair of top shoulder strap segments 7 have one end stitched or otherwise fixedly secured to the backrest 3 and extend around a rear grid element 23a of the back supporting rear grid 23, where the top shoulder strap segments 7 may be extended over the shoulders of the child 28, as illustrated in FIG. 1 or optionally, initially crossed behind the neck of the child 28 and then extended over the shoulders of the child 28, as illustrated in FIG. 6. In each case the top shoulder strap segments are crossed at the chest of the child 28 and connect to the bottom shoulder strap segments 8, one end of each of which is attached to the seat segment 2. The bottom shoulder strap segments 8 extend around a support grid element 21a of the support grid 21, between the legs of the child 28, to the top shoulder strap segments 7. In a preferred embodiment of the invention shoulder strap buckles 9 are sewn or otherwise fitted to the bottom shoulder straps segments 8 and are provided with buckle receptacles 10 for receiving corresponding buckle tabs 11, sewn or otherwise connected to the extending ends of the top shoulder strap segments 7, for removably connecting the top shoulder strap segments 7 to the bottom shoulder strap segments 8, respectively, as illustrated in FIG. 2. Accordingly, it will be appreciated from a consideration of FIG. 6 that in a preferred embodiment of the invention the top shoulder strap segments 7 are crossed at a first strap overlap 12 behind the neck of the child 28 and at a second strap overlap 13 across the chest of the child 28 and extend to the point of attachment with the bottom shoulder strap segments 8, respectively, at the shoulder strap buckles 9.

In a most preferred embodiment of the invention strap loops 14 are provided in the bottom shoulder strap segments 8 for receiving a pair of lap strap segments 17 that define a lap strap 16, as illustrated in FIG. 7. One end of each of the lap strap segments 17 is sewn or otherwise attached to the seat segment 2 as illustrated in FIG. 2, and the lap strap segments 17 extend around spaced side grid elements 22a of the side grids 22 of the shopping cart 20, with the opposite ends of the lap strap segments 17 joining at a lap strap buckle 18, fitted to one of the lap strap segments 17 and receiving a buckle tab 11 of the opposite lap strap segment 17, to removably secure the lap strap 16 in functional configuration across the lap of the child 28. In a preferred embodiment of the invention the lap strap segments 17 project through the strap loops 14 provided in the bottom shoulder strap segments 8, as illustrated in FIG. 7, to further secure the shoulder straps 6 in a desired restraint position on the lap strap 16 in the child restraint seat 1. Accordingly, referring again to FIGS. 1 and 6 of the drawings it will be appreciated that when the child restraint seat 1 is in functional configuration securing the child 28 in the shopping cart 20, the shoulder straps 6 and the lap strap 16 serve not only to maintain the child 28 in the seat segment 2 and against the backrest 3, but also the seat segment 2 and backrest 3, as well as the child 28, in place on the support grid 21, leaning against the rear grid 23 of the shopping cart 20, with the child's legs extending through the leg openings 25 provided in the front grid 24. The first strap overlap 12 and second strap overlap 13 of the shoulder straps 6 insure that the child cannot slip the top shoulder strap segments 7 over his head or otherwise remove or manipulate the shoulder straps 6 and the lap strap 16 and stand up or lean over in the shopping cart 20. However, removal of the child 28 from the shopping cart 20 can be quickly and easily effected by simply releasing the shoulder strap buckles 9 and the lap strap buckle 18, each of which is conveniently located in front of the child 28, readily accessible forward of the cart push bar 26.

Referring now to FIG. 5 of the drawings, the child can be quickly and easily restrained on the support grid 21 of the shopping cart 20 without use of a lap strap 16 by placing the seat segment 2 and backrest 3 in position on the support grid 21 (illustrated in FIG. 1), positioning the child on the seat segment 2 and the backrest 3, with the child's legs extending through the leg openings 25 in the front grid 24 (illustrated in FIG. 1) of the shopping cart 20 and quickly and easily extending the top shoulder strap segments 7 around one or more rear grid elements 23a of the support grid 21, crossing the top shoulder strap segments 7 to define only the second strap overlap 13. The bottom shoulder strap segments 8 are then similarly extended around one or more support grid elements 21a of the front grid 24, between the legs of the child 28, where they are attached to the top shoulder straps segments 7 by means of the connecting shoulder strap buckles 9 and buckle tabs 11. Accordingly, the shoulder straps 6 restrain the child 28 in the seat segment 2 and backrest 3 of the shopping cart 20. Under circumstances where additional restraint is desired as illustrated in FIG. 1, the lap strap 16 can also be secured in place over the lap of the child 28 by extending the respective lap strap segments 17 around the corresponding and opposed side grid elements 22a of the side grids 22, and optionally through the strap loops 14 in the bottom shoulder strap segments 8 and connecting the lap straps segments 17 by means of the lap strap buckle 18 and the corresponding buckle tab 11.

It will be appreciated by those skilled in the art that the child restraint seat of this invention can be constructed in any desired size or configuration, including a separate seat segment 2 and backrest 3, joined at a hinge area 4 of desired design and fitted with appropriate padding 5, (FIG. 3), or configured from a single piece of flexible, resilient padded or expanded foam material such as polyurethane or the like (FIG. 4), which is capable of receiving and anchoring one end of the top shoulder strap segments 7, bottom shoulder strap segments 8 and, if necessary, the lap strap segments 17. Furthermore, the shoulder straps 6 and the lap strap 16 can be constructed of any desired material, according to the knowledge of those skilled in the art, but is most preferably constructed of nylon webbing material similar to the material used in constructing seat belts for automobiles, of desired weight and size, further according to the knowledge of those skilled in the art.

It will be further appreciated by those skilled in the art that the child 28 can also be placed in the grocery area of the shopping cart 20 and restrained in the manner described above using the child restraint seat 1, while his or her back rests against any of the grid walls of the shopping cart 20.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A child restraint seat for restraining a child in a shopping cart having a seating frame, said child restraint seat comprising seat means adapted to receive the child and rest in the seating frame of the shopping cart; a pair of top shoulder strap segments each having one end attached to said seat means and the opposite end of said top shoulder strap segments extending from said seat means around the seating frame of the shopping cart and across the child's chest and a pair of bottom shoulder strap segments, each having one end secured to said seat means and opposite ends of said bottom shoulder strap segments extending around the seating frame between the child's legs; and shoulder strap buckle means provided on said top shoulder strap segments for securing said opposite ends of said top shoulder strap segments to said opposite ends of said bottom shoulder strap segments.

2. The child restraint seat of claim 1 wherein said seat means comprises a seat segment and a backrest segment hingedly connected to said seat segment for accommodating the child in the seating frame of the shopping cart.

3. The child restraint seat of claim 1 wherein said shoulder strap buckle means comprises a shoulder strap quick-disconnect buckle.

4. The child restraint seat of claim 1 comprising a lap strap attached to said seat means and extending around the seating frame of the shopping cart and around the child's legs and lap strap buckle means provided on said lap strap for securing said lap strap across the child's legs.

5. The child restraint seat of claim 4 wherein said seat means comprises a seat segment and a backrest segment hingedly connected to said seat segment for accommodating the child in the seating frame of the shopping cart.

6. The child restraint seat of claim 4 wherein said lap strap buckle means comprises a lap strap quick-disconnect buckle.

7. The child restraint seat of claim 1 wherein said seat means comprises a one-piece, resilient, flexible seat and backrest for accommodating the child in the seating frame of the shopping cart.

8. The child restraint seat of claim 7 wherein said shoulder strap buckle means comprises a shoulder strap quick-disconnect buckle.

9. The child restraint seat of claim 7 comprising a lap strap attached to said seat and extending around the seating frame of the shopping cart and around the child's legs and lap strap buckle means provided on said lap strap for securing said lap strap across the child's legs.

10. The child restraint seat of claim 9 comprising a strap loop provided in each of said bottom shoulder strap segments for accommodating said lap strap and wherein said shoulder strap buckle means comprises a shoulder strap quick-disconnect buckle and said lap strap buckle means comprises a lap strap quick-disconnect buckle.

11. A child restraint seat for restraining a child in a shopping cart having a seating frame, said child restraint seat comprising a seat adapted to receive the child and rest in the seating frame of the shopping cart; a pair of top shoulder straps having one end attached to said seat and the opposite end of said top shoulder straps extending from said seat around the seating frame of the shopping cart, said top shoulder straps crossed behind the child's head and extended over the child's shoulders and crossed at the child's chest; a pair of bottom shoulder straps having one end attached to said seat and the opposite end of said bottom shoulder straps extending from said seat around said seating frame between the child's legs; and shoulder strap buckle means provided on said top shoulder straps and said bottom shoulder straps for connecting said top shoulder straps to said bottom shoulder straps and securing said top shoulder straps and said bottom shoulder straps around the child and restraining said child restraint seat and the child in the seating frame of the shopping cart.

12. The child restraint seat of claim 11 comprising a lap strap attached to said seat means and extending around the seating frame of the shopping cart and around the child's legs and lap strap buckle means provided on said lap strap for securing said lap strap across the child's legs.

13. The child restraint seat of claim 12 comprising a strap loop provided in each of said bottom shoulder strap segments for accommodating said lap strap.

* * * * *